United States Patent Office 3,241,860
Patented Mar. 22, 1966

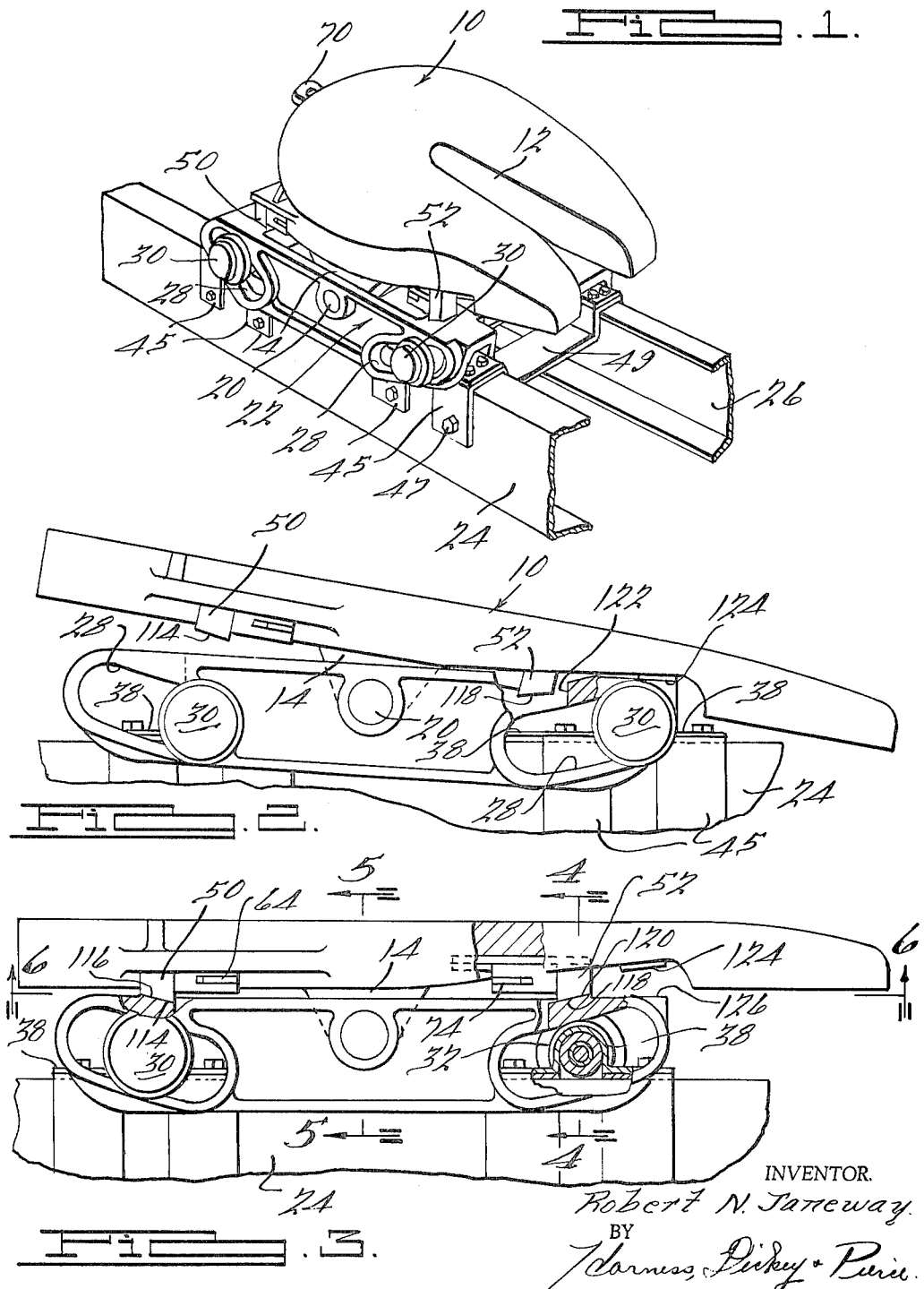

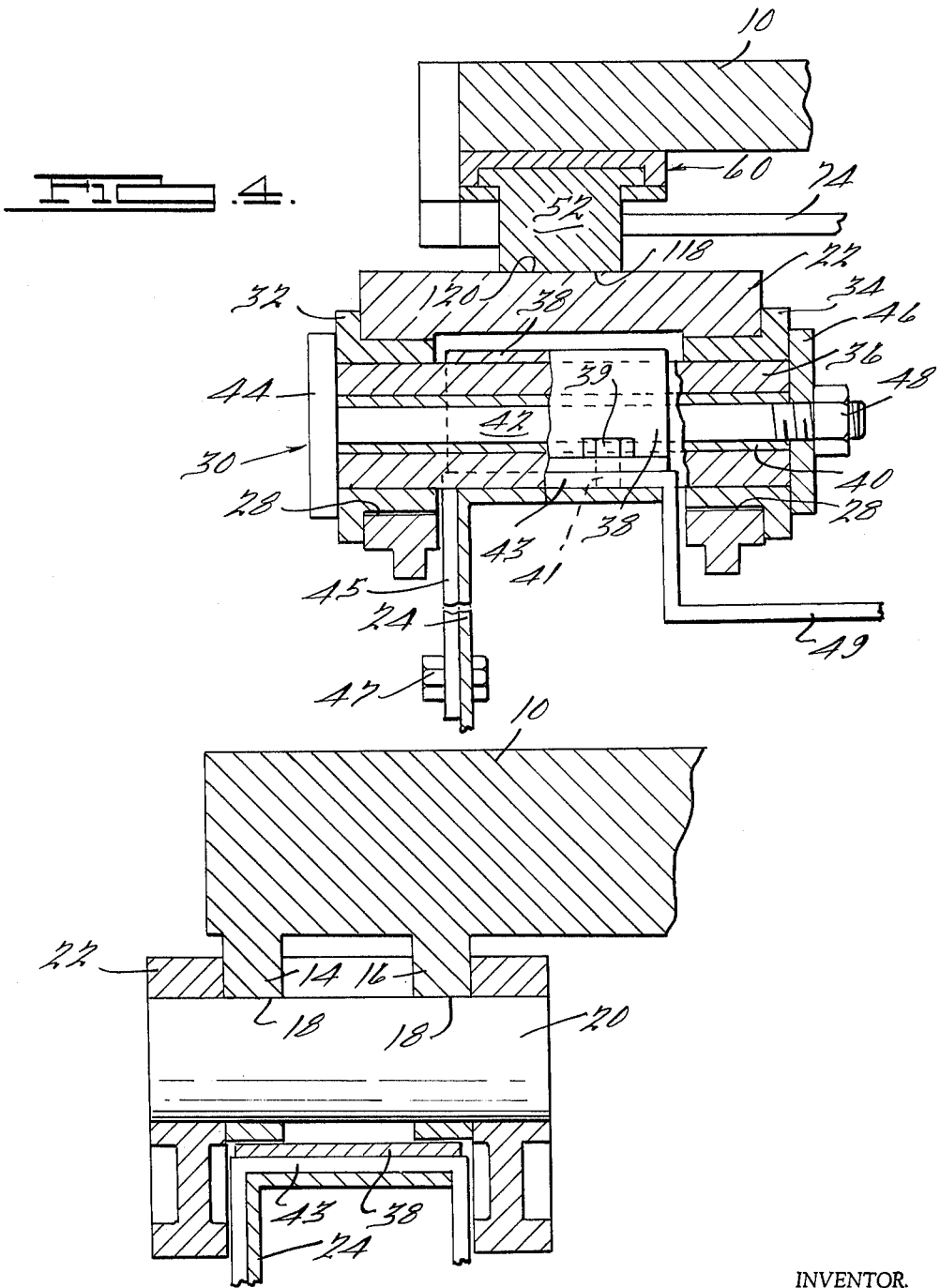

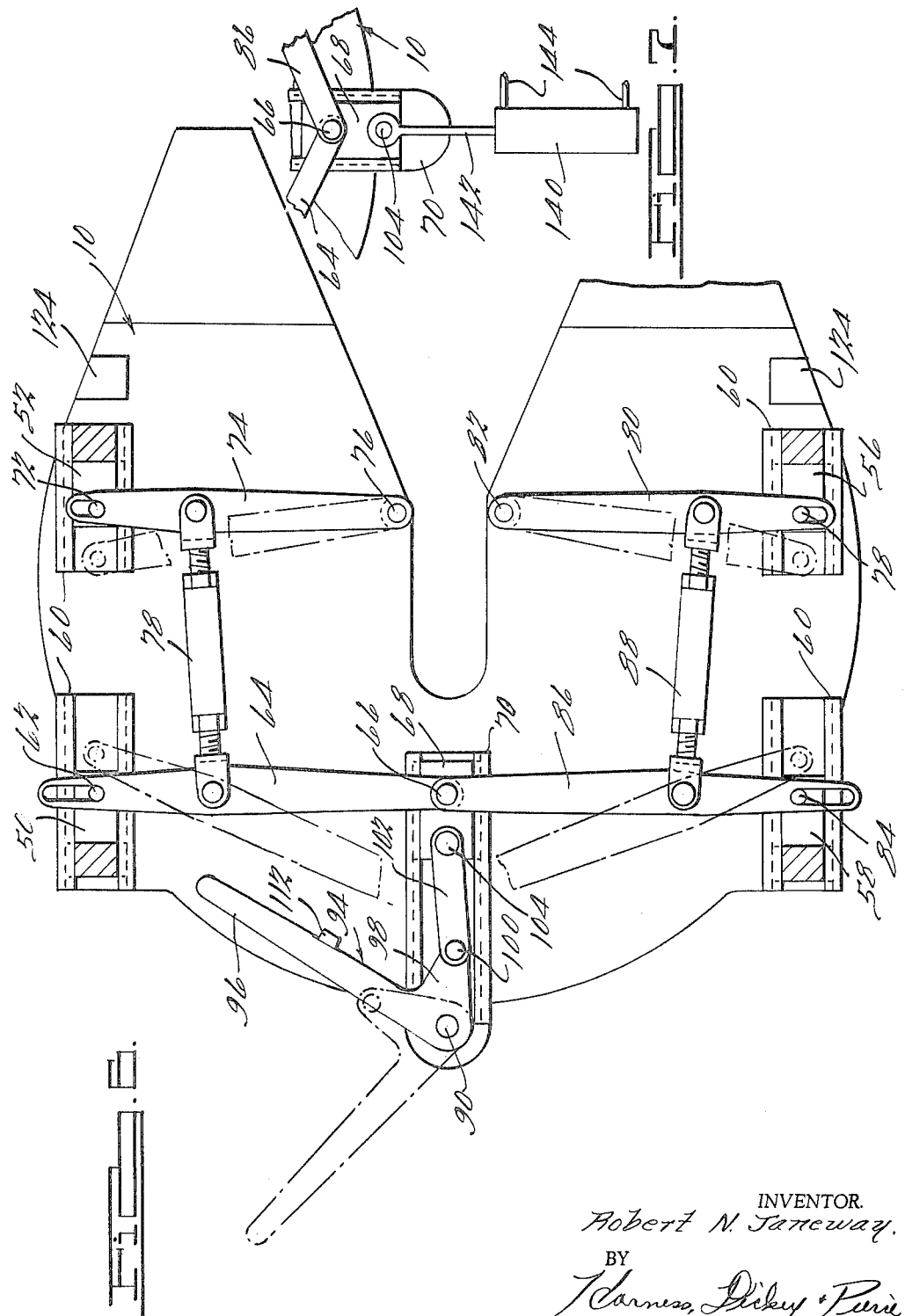

3,241,860
TRACTOR-TRAILER FIFTH WHEEL COUPLING
Robert N. Janeway, 8120 E. Jefferson, Detroit, Mich.
Filed Sept. 12, 1963, Ser. No. 308,428
19 Claims. (Cl. 280—438)

The present invention relates to tractor-trailer fifth wheel couplings, and particularly to improvements in a friction free fifth wheel coupling that elevates the effective horizontal pivot axis of the fifth wheel coupling to a position where the fore and aft motion caused by tractor and/or trailer pitching and transmitted to the tractor operator is greatly reduced, such as that disclosed in my U.S. Letters Patent No. 2,958,542, issued Nov. 1, 1960, the disclosure of which is incorporated herein by reference.

Although the theories set forth in the aforementioned patent have proven to be extremely sound in principle, i.e., the concept of substantially elevating the effective pivotal axis of the fifth wheel to approximately the level of the trailer center of gravity and the driver's neck, the apparatus disclosed therein has been found to have several defects. One is that the skid plate could not be readily tilted to facilitate the coupling and uncoupling of a trailer. Another is that the skid plate was not positively connected to the tractor frame, so that upon severe acceleration and deceleration of the vehicle the shoes would lift off the forward and rearward rollers, respectively, causing rough and noisy operation. Also, there was no way in which the apparatus could be used as a conventional coupling, in the event it was desired to do so.

It is therefore a primary object of the present invention to provide a tractor-trailer fifth wheel coupling having a substantially raised effective pivot axis, wherein a positive substantially friction-free connection is maintained between the skid plate and tractor frame for purposes of safety and to insure proper quiet and smooth operation of the coupling even under severe acceleration and deceleration conditions.

Another object resides in the provision of a fifth wheel coupling having a substantially raised effective pivot axis, wherein means are provided for readily tilting the skid plate with respect to the tractor frame a sufficient degree to facilitate easy coupling and uncoupling of a trailer. A related object concerns the provision of such a coupling, wherein means are provided for securely locking the skid plate from such tilting during normal driving conditions, which means engages the skid plate at a plurality of points thereon and is self-equalizing to apply substantially equal locking forces at each of such points.

A further object concerns the provision of a fifth wheel coupling having two modes of operation, a normal one in which the effective pivot axis is substantially raised and another where it is at the conventional level, and wherein means are provided whereby this effective pivotal axis may at the operator's desire be quickly and easily lowered from the substantially raised level to the conventional level.

Yet another object resides in the provision of a fifth wheel coupling of the aforesaid type which is of relatively simple and extremely sturdy construction, which may be quickly and easily operated, and which is adapted to receive a tractor kingpin of conventional construction.

These and other objects of the present invention will become apparent from consideration of the specification, taken in conjunction with the accompanying drawings in which there is illustrated an exemplary embodiment of the present invention, by way of example, and wherein:

FIGURE 1 is a perspective view of a tractor-trailer fifth wheel coupling incorporating the principles of the present invention;

FIGURE 2 is a side elevational view thereof, partly in section, shown in a tilted tractor-receiving position;

FIGURE 3 is a side elevational view thereof, partly in section, shown in a normal operating position;

FIGURE 4 is a transverse sectional view taken along the line 4—4 in FIGURE 3;

FIGURE 5 is a transverse sectional view taken along line 5—5 in FIGURE 3;

FIGURE 6 is a bottom plan view of the skid plate forming a part thereof, looking along line 6—6 in FIGURE 3; and FIGURE 7 is a fragmentary bottom plan view of a portion of the skid plate showing a modification thereof.

Generally speaking, the coupling comprises a skid plate 10 of conventional upper exterior configuration, having the usual trailer kingpin receiving segmental slot 12, a pair of projections 14 and 16 depending from each side thereof in horizontal transverse alignment with one another, a bore 18 extending through all four projections, and a shaft 20 rotatably positioned within bore 18 of each pair of projections, each end of each shaft 20 being supported by the sides of a generally channel-shaped carriage 22. The carriages, two of which are provided, overlie and to some extent surround side rails 24 and 26, respectively, of the associated tractor chassis frame. Each of the sides of each carriage is provided at the forward and rearward end thereof with an arcuate shaped slot 28. Each slot 28 is of substantially uniform width, and all are of substantially the same size. The centers of curvature for each of these eight slots lie on a common horizontal transverse axis disposed substantially above the skid plate, in the manner taught by the aforementioned Letters Patent.

Each carriage does not rest directly upon the side rail of the tractor frame but is supported for rotational oscillation with respect to the frame by means of two longitudinally spaced substantially friction free roller assemblies 30 rigidly secured to the top of the associated side rail. The forward roller assembly is positioned within the forward slots on each side of the carriage, for rolling supporting engagement with the sides thereof, and the rearward roller assembly is similarly positioned within the rearward slots on each side of the carriage. Consequently, each carriage is secured to the tractor frame in such a way that the only possible relative movement between the two is along an arcuate path the center of curvature of which lies transversely to and substantially above the skid plate, and movement along this limited path is substantially friction free.

As best seen in FIGURES 3 and 4, each roller assembly comprises a pair of slot engaging rollers 32 and 34 journaled for rotation upon a shaft 36 which is tightly secured to the top of the associated side rail by means of a strap 38 which overlies the frame on each side thereof, as best shown in FIGURE 3. Strap 38 is continuous for the length of the coupling to establish the spacing of the roller assemblies, and adjacent each side of each roller assembly it is secured to the frame by a plurality of nuts 39 (only one shown) threadably secured to a threaded stud 41 affixed to a plate 43 positioned directly on the frame side rail. Plate 43 has an integral downwardly projecting outer portion 45 which is secured by a suitable fastener 47 to the side rail, adjacent the neutral axis thereof, and an integral cross member 49 extending to the corresponding plate 43 on the opposite side rail, with which it is also integral. Passing through shaft 36, within a spacer sleeve 40 therein, is a bolt-like member 42 having at one end a relatively large head 44 and at the other end a washer 46, the assembly being held together by means of a nut 48. Each roller assembly is such that rollers 32 and 34 may rotate freely with respect to the remainder of the roller assembly, and there is just sufficient clearance between rollers 32 and 34 and the sides of the slots in which they roll so that they may roll freely on either the upper or lower arcuate sides without dragging on the opposite sides. Normally the rollers will roll upon the upper sides of the slots to support the carriages, however, upon severe acceleration and deceleration the forward and rearward rollers, respectively, may be brought into engagement with the lower sides of the associated slots. In this event, however, the desired oscillatory motion will be maintained because both sides of each slot have the same center of curvature. The ends of the slots define the maximum amount the carriages may move with respect to the tractor frame.

Under normal operating conditions it is desirable that skid plate 10 be disposed substantially parallel to the side rails of the tractor frame, as seen in FIGURE 3; however, in order to easily receive a trailer it is desirable that the skid plate be capable of tilting downwardly and rearwardly in the manner shown in FIGURE 2. This is facilitated in the present embodiment by means of shafts 20 which permit relative rotational movement between the skid plate and carriages, and a linkage and wedge system disposed therebetween for locking the skid plate and carriages rigid with respect to one another under normal operating conditions. This linkage and wedge system is best illustrated in FIGURES 3 and 6.

As can be seen, the linkage system is of the self-equalizing or self-adjusting type and is adapted to actuate four wedge members, indicated at 50, 52, 56 and 58. A pair of wedge members is mounted on each side of the bottom surface of the skid plate, overlying the carriages, and all of the wedge members are mounted for longitudinal reciprocal movement, such as by providing the upper surfaces of each of the wedge members with longitudinally extending flanges slidably received within correspondingly shaped T-shaped slots in the lower surface of the skid plate, as indicated at 60. Pivotally secured at one end to wedge member 50, as at 62, is a live lever 64, the opposite end of which is pivotally secured at 66 to a crosshead 68 mounted for longitudinal reciprocating movement in a suitable guide member 70. Pivotally secured at one end to wedge member 52, as at 72, is a dead lever 74, the opposite end of which is pivotally secured at 76 to the skid plate. Extending between levers 64 and 74 and pivotally secured to both of them in an adjustable link 78.

The linkage system for wedge members 56 and 58 is generally similar to and symmetrical with the lever system just described. Pivotally secured at one end to wedge member 56, as at 78, is a dead lever 80, the opposite end of which is pivotally secured at 82 to the bottom surface of the skid plate. Pivotally secured at one end to wedge members 58, as at 84, is a live lever 86, the opposite end of which is also secured to crosshead 68 at pivot 66. Extending between levers 80 and 86 and pivotally secured to each of them in an adjustable link 88.

Guide member 70 is provided at the forward end thereof with pivot means 90 for pivotally mounting a crank 94 having a long arm 96 adapted to be actuated manually and a relatively short arm 98 to which is pivotally secured, as at 100, a short link 102, the opposite end of which is pivotally secured at 104 to cross at 68. The crank, linkage system, and wedge members are shown in solid lines in their advanced or normal operating position. As can be seen, when crank 94 is in its retracted position, indicated in phantom lines, the wedge members on both sides of the skid plate are moved toward one another, out of engagement with the carriage as will be described hereinbelow. When crank 94 is moved toward its normal operating or advanced position, shown in solid lines, the wedge members on each side of the skid plate are caused to move away from each other by movement of the crosshead to the right as seen in FIGURE 6. Crank 94 and link 102 operate on the toggle principle and as can be seen when the crank is in its fully advanced position pivotal connection 100 is slightly beyond the center line of pivots 90 and 104. Further movement of the handle is prevented by means of a suitable stop 112 on the bottom of the skid plate.

The manner in which the wedge members coact with the carriages to rigidly lock the carriages and skid plate together is best illustrated in FIGURES 2 and 3. Since the entire unit is symmetrical about a longitudinal center line, only the half of the unit showing in FIGURES 2 and 3 will be discussed. As is best illustrated in FIGURE 3, wedge member 50 is provided with an inclined wedging surface 114 adapted to engage a correspondingly inclined wedging surface 116 on the forward upper surface of carriage 22. Similarly, wedge member 52 is provided with an inclined wedging surface 118 adapted to engage a similarly inclined wedging surface 120 on the rearward upper surface of carriage 22. Wedging surfaces 116 and 120 are positioned substantially over the portions of the slots at which the rollers normally bear and four wedges are used to accommodate high running loads with a minimum of structure. Consequently, when crank 94 is urged into its solid line position shown in FIGURE 6, the wedges assumed the position shown in FIGURE 3 and the entire construction is rigidified, i.e. the skid plate and carriages are fixed with respect to each other. When crank 94 is moved to its retracted position shown in phantom lines in FIGURE 6, the wedge members assume the retracted position shown in FIGURE 2, in which position the rearward end of the skid plate will drop or may be pushed into the position shown if no trailer is coupled thereto. The skid plate will remain in this position through the combined influences of gravity and friction. A generally vertical surface 122 adjacent wedging surface 120 at the rearward end of the carriage defines a space in the carriage into which wedge member 52, and its corresponding wedge member on the oopsite side, may drop out of the way when the skid plate is tilted. The bottom surface of the skid plate 10 is provided with a pair of pads 124 adapted to rest on portion 126 of the upper rearward surface of each of the carriages when the skid plate is inclined as shown in FIGURE 2.

Coupling and uncoupling of a tractor-trailer may therefore be accomplished as follows: Uncoupling is achieved by simply pulling crank 96 to its retracted position, releasing the kingpin locking device (not shown), and driving the tractor from beneath the trailer. As this occurs the skid plate will tilt to the position shown in FIGURE 2, at which time the crank may be released since in this position of the skid plate the wedges will not return to their advanced position because of friction and the interferring position of surface 122. With the skid plate in its inclined position, coupling of the tractor and the trailer is achieved quite simply by backing the tractor underneath the trailer in the usual manner. This will cause the skid plate to swing up to its normal generally horizontal position, whereupon crank 94 may be pushed to its advanced position to urge the four wedges into a locking position, as shown in FIGURE 3. The conventional self-locking catch for the kingpin (not shown) would engage the latter automatically.

The linkage and wedge system is so designed that all the wedges will engage positively with the load equally distributed among them, even though the skid plate after coupling is not truly parallel to the frame side rails. It is not desirable for any static angularity or distortion to be taken up by displacement of the carriages from their normal central position. Also, differences in the resistance of the wedges to engagement or disengagement, between opposite sides of the apparatus, should not interfere with positive uniform wedging action. As can be seen, the two wedges on each side of the skid plate are actuated in opposite directions. However, in the locked or fully advanced position of the crosshead the live and dead levers on each side of the apparatus form a parallelogram which is free to assume any limited angular displacement, while maintaining a fixed spacing between the wedge members. If the skid plate, at coupling, is not exactly parallel to the frame, the space between the wedging surfaces will be reduced at one wedge member and will be increased substantially the same amount at the other. Therefore, both wedge members on a given side of the skid plate will automatically adjust themselves into positive equal-load engagement with their repective mating wedging surfaces. Since the wedges on each side of the apparatus operate independently there will be complete equalization of the load on all the wedge members. Furthermore, since both live levers are pivotally connected to the crosshead at a single point any difference in resistance of the wedges to engagement or disengagement from one side to the other will produce no force movement tending to jam the mechanism or otherwise impeded smooth operation. Adjustable links 78 and 88 are of the turnbuckle type and may be used to independently adjust the spacing between each pair of wedge members, both initially and also to take up any wear in the system. Also, shafts 36 may be eccentric where they rest on the side rails so that they may be initially adjusted vertically by slightly rotating them to insure equal load support by all of the rollers. In addition, the combination of the toggle action of the crank and the leverage ratio of the levers (approximately 2:1 as shown) provides a large mechanical damage for locking and unlocking the wedge members.

A modified means for actuating crosshead 68 is illustrated in FIGURE 7. In this embodiment, crank 94, link 102, and stop 112 are eliminated and in lieu thereof there is provided a pneumatic or hydraulic motor 140 having a connecting rod 142 connected to crosshead 68 at pivot point 104. Motor 140 may be of the double-acting type and is provided with supply and return fluid lines 144. In FIGURE 7 the crosshead is shown in its left-most position, i.e. its retracted position, and as can be seen the actuation of motor 140 by conventional valve means will cause crosshead 68 to be advanced to the right to its wedge locking position. Since motor 140 may be controlled remotely from the cab of the tractor, coupling and uncoupling may be easily effeced by a single operator in the tractor cab.

The raising of the effective pivotal axis of the fifth wheel coupling, as achieved by the present invention, serves to reduce severe fore and aft motions transmitted to the tractor operator which are caused primarily by pitching of the trailer and/or tractor, i.e., forces imposed on the vehicle in a vertical direction. In the event that road and load conditions are such that these vertical forces do not present a problem and instead there are primarily longitudinal forces acting between the tractor and trailer, such as caused by acceleration and deceleration, or possibly load shifting, it is possible to transform the mode of operation of the subject apparatus to that similar to more conventional fifth wheel couplings, i.e., with a lowered effective pivot point. This may be accomplished by simply retracting the wedge members and allowing the skid plate to pivot freely about the axis of shafts 20. If remotely controlled power means is utilized, such as shown in FIGURE 7, this function may be easily achieved from the tractor cab at the operator's will as he is driving the vehicle. Actually, in this condition the coupling will also give some of the benefits of the raised pivot axis since the rollers will remain free in the slots.

By constructing the carriages so that they somewhat overhand the tractor frame side rails it is possible to maintain the standardized height between the tractor frame and skid plate. Insofar as other dimensions are concerned it has been discovered that for most tractor-trailer rigs the desired results may be obtained using a radius of curvature of approximately 36″ for the arcuate slots with the center axis positioned in a transverse vertical plane bisecting a line drawn between the centers of the forward and rearward slots. Also, it has been found desirable for most equipment to form the arcuate slots of sufficient length that there is at least approximately 2″ of travel of the carriage in both directions from its center position. Each roller is preferably as large as possible within its slot, with only a running clearance provided between it and one side of its slot.

Thus, there is disclosed in the above description and in the drawings several exemplary embodiments of the present invention which fully and effectively accomplish the objects thereof. However, it will be apparent that variations in the details of construction may be indulged in without departing from the sphere of the invention as herein described, or the scope of the appended claims.

What is claimed is:

1. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, and rollers rotatably mounted on the tractor frame and positioned within said slots for supporting said skid plate for oscillatory motion about said axis with respect to the tractor frame.

2. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, and rollers rotatably mounted on the tractor frame and positioned within said slots for supporting said skid plate for oscillatory motion about said axis with respect to the tractor frame, said rollers being of a diameter substantially the same but slightly less than the width of said slots.

3. A tractor-trailer fifth wheel coupling comprising a skid plate having means therein adapted to receive a trailer kingpin, carriage means pivotally connected to said skid plate for supporting the latter for pivotable movement about a horizontal transverse axis, means on said carriage defining a plurality of arcuate surfaces, each of said surfaces having a common center of curvature lying on a horizontal transverse axis located above said skid plate, and rollers rotatably mounted on the tractor frame and positioned in rolling engagement with said surfaces for supporting said skid plate for oscillatory motion about said axis with respect to the tractor frame.

4. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate surfaces, each of said surfaces being of substantially uniform width and having a common center of curvature lying on a horizontal transverse axis located above said skid plate, locking means operatively associated with said skid plate and said carriage means for rigidly locking said skid plate against movement relative to said carriage means, and rollers rotatably mounted on the tractor frame and positioned in rolling engagement with said surfaces for supporting said skid plate for oscillatory motion about said axis with respect to the tractor frame.

5. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, locking means operatively associated with said skid plate and said carriage means for rigidly locking said skid plate against movement relative to said carriage means, and rollers rotatably mounted on the tractor frame and positioned within said slots for supporting said skid plate for oscillatory motion about said axis with respect to the tractor frame.

6. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, locking means operatively associated with said skid plate and said carriage means for rigidly locking said skid plate against movement relative to said carriage means, and rollers rotatably mounted on the tractor frame and positioned within said slots for supporting said skid plate for oscillatory motion about said axis with respect to the tractor frame, said rollers being of a diameter substantially the same but slightly less than the width of said slots.

7. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate surfaces, each of said surfaces being of substantially uniform width and having a common center of curvature lying on a horizontal transverse axis located above said skid plate, locking means operatively associated with said skid plate and said carriage means for rigidly locking said skid plate against movement relative to said carriage means, said locking means including a plurality of wedge members adapted to be wedged between said skid plate and said carriage means to prevent relative movement thereof, and rollers rotatably mounted on the tractor frame and positioned in rolling engagement with said surfaces for supporting said skid plate for oscillatory motion about said axis with respect to the tractor frame.

8. Apparatus as claimed in claim 7, wherein said wedge members engage said carriage at points located in substantially vertical alignment with the points of engagement of said rollers and said carriage.

9. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, locking means operatively associated with said skid plate and said carriage means for rigidly locking said skid plate against movement relative to said carriage means, said locking means including a plurality of wedge members adapted to be wedged between said skid plate and said carriage means to prevent relative movement thereof, and rollers rotatably mounted on the tractor frame and positioned within said slots for supporting said skid plate for oscillatory motion about said axis with respect to the tractor frame.

10. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate surfaces, each of said surfaces being of substantially uniform width and having a common center of curvature lying on a horizontal transverse axis located above said skid plate, locking means operatively associated with said skid plate and said carriage means for rigidly locking said skid plate against movement relative to said carriage means, said locking means including a plurality of wedge members adapted to be wedged between said skid plate and said carriage means to prevent relative movement thereof, linkage means for simultaneously moving said wedge members into and out of wedging position, single crank means for actuating said linkage means, and rollers rotatably mounted on the tractor frame and positioned in rolling engagement with said surfaces for supporting said skid plate to the tractor frame.

11. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate surfaces, each of said surfaces being of substantially uniform width and having a common center of curvature lying on a horizontal transverse axis located above said skid plate, locking means operatively associated with said skid plate and said carriage means for rigidly locking said skid plate against movement relative to said carriage means, said locking means including a plurality of wedge members adapted to be wedged between said skid plate and said carriage means to prevent relative movement thereof, linkage means for simultaneously moving said wedge members into and out of wedging position, single motor means for actuating said linkage means, and rollers rotatably mounted on the tractor frame and positioned in rolling engagement with said surfaces for supporting said skid plate for oscillatory motion about said axis with respect to the tractor frame.

12. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate surfaces, each of said surfaces being of substantially uniform width and having a common center of curvature lying on a horizontal transverse axis located above said skid plate, locking means operatively associated with said skid plate and said carriage means for rigidly locking said skid plate against movement relative to said carriage means, said locking means including a plurality of wedge members adapted to be wedged between said skid plate and said carriage means to prevent relative movement thereof, self equalizing linkage means for simultaneously moving said wedge members into and out of wedging position, and rollers rotatably mounted on the tractor frame and positioned in rolling engagement with said surfaces for supporting said skid plate for oscillatory motion about said axis with respect to the tractor frame.

13. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, locking means operatively associated with said skid plate and said carriage means for rigidly locking said skid plate against movement relative to said carriage means, said locking means including a plurality of wedge members adapted to be wedged between said skid plate and said carriage means to prevent relative movement thereof, self equalizing linkage means for simultaneously moving said wedge members into and out of wedging position, and rollers rotatably mounted on the tractor frame and positioned within said slots for supporting said skid plate for oscillatory motion about said axis with respect to the tractor frame.

14. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate surfaces, each of said surfaces being of substantially uniform width and having a common center of curvature lying on a horizontal transverse axis located above said skid plate, locking means operatively associated with said skid plate and said carriage means for rigidly locking said skid plate against movement relative to said carriage means, said locking means engaging said skid plate at a plurality of points thereon and being self equalizing to apply substantially equal locking forces at each of said points, and rollers rotatably mounted on the tractor frame and positioned in rolling engagement with said surfaces for supporting said skid plate for oscillatory motion about said axis with respect to the tractor frame.

15. A tractor-trailer fifth wheel coupling comprising a skid plate having means therein adapted to receive a trailer kingpin, carriage means pivotally connected to said skid plate for supporting the latter for pivotal movement about a horizontal transverse axis, means on said carriage defining a plurality of arcuate slots, each of said slots being of substantially uniform width and having a common center of curvature lying on a horizontal transverse axis located above said skid plate, locking means operatively associated with said skid plate and said carriage means for rigidly locking said skid plate against movement relative to said carriage means, said locking means engaging said skid plate at a plurality of points thereon and being self equalizing to apply substantially equal locking forces at each of said points, and rollers rotatably mounted on the tractor frame and positioned within said slots for supporting said skid plate for oscillatory motion about said axis with respect to the tractor frame.

16. A tractor-trailer fifth wheel coupling comprising a skid plate having means therein adapted to receive a trailer kingpin, two longitudinal carriages pivotally connected to said skid plate for supporting the latter for pivotal movement about a horizontal transverse axis, means on each of said carriages defining a pair of arcuate slots, one at each end, each of said slots being of substantially uniform width and having a common center of curvature lying on a horizontal transverse axis located above said skid plate and centered between said slots in a pair, locking means operatively associated with said skid plate and said carriages for rigidly locking said skid plate against movement relative to said carriages, said locking means including a plurality of wedge members adapted to be wedged between said skid plate and said carriages to prevent relative movement thereof, self equalizing linkage means mounted on the bottom of said skid plate for simultaneously moving said wedge members into and out of wedging position, and two transversely aligned pairs of rollers rotatably mounted on the tractor frame with each pair of rollers positioned within each of said pairs of slots for supporting said skid plate for oscillatory motion about said axis with respect to the tractor frame, said rollers being of a diameter substantially the same but slightly less than the width of said slots.

17. A tractor-trailer fifth wheel coupling comprising: a skid plate having means therein adapted to receive a trailer kingpin; carriage means; a first pivotal connection between said carriage means and said skid plate whereby said carriage means pivotally supports said skid plate; and a second pivotal connection between the tractor frame and said carriage means whereby the tractor frame pivotally supports said carriage means, one of said pivotal connections comprising means on one of the pivoted members defining a plurality of arcuate surfaces, each of said surfaces having a common center of curvature lying on a transverse horizontal axis located above said skid plate, and a plurality of rollers mounted on the other of the pivoted members for rolling engagement with said arcuate surfaces.

18. A tractor-trailer fifth wheel coupling comprising: a skid plate having means therein adapted to receive a trailer kingpin; carriage means; a first pivotal connection between said carriage means and said skid plate whereby said carriage means pivotally supports said skid plate; and a second pivotal connection between the tractor frame and said carriage means whereby the tractor frame pivotally supports said carriage means, one of said pivotal connections comprising means on one of the pivoted members defining a plurality of arcuate slots, each of said slots being of substantially uniform width and having a common center of curvature lying on a transverse horizontal axis located above said skid plate, and a plurality of rollers mounted on the other of the pivoted members for rolling engagement within said slots.

19. A tractor-trailer fifth wheel coupling comprising: a skid plate having means therein adapted to receive a trailer kingpin; carriage means; a first pivotal connection between said carriage means and said skid plate whereby said carriage means pivotally supports said skid plate; a second pivotal connection between the tractor frame and said carriage means whereby the tractor frame pivotally supports said carriage means, one of said pivotal connections comprising means on one of the pivoted members defining a plurality of arcuate surfaces, each of said surfaces having a common center of curvature lying on a transverse horizontal axis located above said skid plate, and a plurality of rollers mounted on the other of the pivoted members for rolling engagement with said arcuate surfaces; and locking means operatively associated with the other of said pivotal connections for preventing relative movement of the members normally pivoted thereby.

References Cited by the Examiner

UNITED STATES PATENTS

| | | | |
|---|---|---|---|
| 2,833,561 | 5/1958 | Vaugoyeau | 280—438 |
| 2,958,542 | 11/1960 | Janeway | 280—438 |

FOREIGN PATENTS 141,759  10/1961  Russia.

LEO FRIAGLIA, *Primary Examiner.*